United States Patent [19]
Forte et al.

[11] Patent Number: 6,071,651
[45] Date of Patent: Jun. 6, 2000

[54] RESILIENT BATTERY SEPARATOR MEDIA AND A BATTERY INCLUDING THE RESILIENT SEPARATOR MEDIA

[75] Inventors: Don August Forte, Evergreen, Colo.; Joseph Rumiesz, Jr., Cohoes, N.Y.; Michael John Cusick, Englewood; Phillip Charles Martin, Conifer, both of Colo.

[73] Assignee: Johns Manville International, Inc., Denver, Colo.

[21] Appl. No.: 09/012,611

[22] Filed: Jan. 23, 1998

Related U.S. Application Data

[63] Continuation-in-part of application No. 08/751,881, Nov. 18, 1996, abandoned, which is a continuation of application No. 08/717,144, Sep. 20, 1996, abandoned.

[51] Int. Cl.[7] .................................................... H01M 2/16
[52] U.S. Cl. ......................... 429/247; 429/249; 429/129; 429/146
[58] Field of Search ............................ 429/247, 249, 429/129, 146

[56] References Cited

U.S. PATENT DOCUMENTS

| 4,298,668 | 11/1981 | Schmidt et al. | 429/250 |
| 4,391,036 | 7/1983 | Kishimoto et al. | 29/623.2 |
| 4,440,838 | 4/1984 | Schmidt | 429/250 |
| 4,908,282 | 3/1990 | Badger | 429/59 |
| 5,091,275 | 2/1992 | Brecht et al. | 429/247 |
| 5,250,372 | 10/1993 | Willmann et al. | 429/146 |
| 5,468,572 | 11/1995 | Zguris et al. | 429/247 |

*Primary Examiner*—Maria Nuzzolillo
*Assistant Examiner*—Raymond Alejandro
*Attorney, Agent, or Firm*—Robert D. Touslee

[57] ABSTRACT

A resilient battery separator, especially suited for use in a starved electrolyte battery, is made of an air laid fibrous mat of randomly oriented, entangled microfibers having a mean diameter between 0.5 and 2.0 microns. The air laid mat weighs between 50 and 450 g/m$^2$ and has a thickness between 0.01 and 0.5 inches. The fibrous mat may be essentially uniform in density throughout its thickness or may include one or two relatively high density, high tensile strength fibrous surface layer(s) and a relatively low density, more resilient fibrous layer integral with and, in one embodiment, intermediate the two surface layers. The microfibers in the surface layer(s) are more entangled than the microfibers in the resilient layer. In a starved electrolyte battery, the separator has a thickness, when subjected to a loading of 1.5 psi, that is equal to or greater than the spacing between the electrode plates of the battery and, preferably, at least 110% of the spacing between the electrode plates of the battery.

40 Claims, 2 Drawing Sheets

RESILIENT BATTERY SEPARATOR MEDIA AND A BATTERY INCLUDING THE RESILIENT SEPARATOR MEDIA

This patent application is a continuation-in-part application of U.S. patent application Ser. No. 08/751,881, filed Nov. 18, 1996, now abandoned, which is a continuation of U.S. patent application Ser. No. 08/717,144, filed Sep. 20, 1996, now abandoned.

BACKGROUND OF THE INVENTION

The present invention is directed to resilient battery separator media and, in a preferred embodiment, to resilient glass microfiber battery separator media that is especially suited for use as a separator in a battery such as, a starved electrolyte battery.

Rechargeable batteries, such as sealed, starved electrolyte, lead/acid batteries, are commonly used as power sources in vehicles, aircraft, emergency equipment and the like. These batteries, which typically range in size from "D" or "beer can" sized batteries to larger sized batteries, are either single or multi-cell batteries. Currently, each cell of a single cell or multi-cell starved electrolyte, lead/acid battery is defined by a sealed compartment which houses a cell pack that includes at least one porous, positive electrode plate, at least one porous, negative electrode plate, and at least one porous, relatively fragile, glass microfiber separator between the electrode plates. A sulfuric acid electrolyte within each cell is absorbed by the porous, glass microfiber separator(s) and the porous electrode plates. Thus, the separators used in starved electrolyte, lead/acid batteries are intended to function: as separators between the positive and negative electrode plates of the cells to maintain the spacings between the positive and negative electrode plates and prevent the formation of short circuits within the cells; and as reservoirs for retaining electrolyte within the cells between the positive and negative electrode plates.

Short circuits within the cells can occur due to direct contact between the positive and negative electrode plates when the spacings between the electrode plates are not maintained or due to the formation of dendrites or moss shaped particles of the electrode materials between the positive and negative electrode plates. Over the service life of such batteries, the electrode plates repeatedly expand and contract due to changes in active material morphology and density produced by the chemical reactions within the cells producing the electrical energy. Thus, to maintain the spacings between the positive and negative electrode plates over the service life of such a battery and to prolong the service life of such a battery, the electrolyte carrying separators should be resilient to maintain contact with the electrode plates and prevent short circuits within the battery through plate to plate contact. In addition, the separators should be free of openings, formed in the separators either during their manufacture or through the handling of the separators and assembly of the battery cells, to prevent or inhibit the formation of short circuiting active material growths, sheddings or dendrites between the electrode plates through such openings over the service life of the batteries. Thus, the separators should be free or essentially free of openings through which active material growths or dendrites could easily form between the electrode plates and should have sufficient integrity to resist tearing, during the handling of the separators and the assembly of separators into the battery cells, which could form openings in the separators through which active material growths or dendrites could easily form between the electrode plates.

Since the separators in starved electrolyte batteries, such as starved electrolyte lead/acid batteries, also function as electrolyte reservoirs, the capacity of such batteries is a function of both the porosity and surface areas of the electrode plates and the porosity and surface areas of the separators in contact with the surfaces of the electrode plates. Thus, to maintain the electrolyte between the positive and negative electrode plates and to maintain the major surfaces of the separators in contact with the surfaces of the electrode plates, the separators of such batteries should be resilient so that the separators continue to recover in thickness after the repeated expansion and contraction of the electrode plates over the service life of such batteries.

Currently, thin, light weight mats or papers of glass fibers, polymeric fibers and/or other fibers (e.g. mats or papers ranging from about 100 to about 450 grams per square meter, such as glass microfiber separator mats for batteries) are made in various wet laid processes. In these wet laid paper making processes, the fibers are manufactured by various processes and collected in bulk. Batches of the glass and/or polymeric fibers, having more than one fiber diameter, are then introduced into a fiber preparation tank or mixer and dispersed in a water slurry within the tank or mixer which is stirred or agitated to cause the different diameter fibers to become thoroughly and randomly mixed with each other. While the stirring or agitation of the fibers in the preparation tank thoroughly mixes the different diameter fibers together in the slurry, the stirring or agitation of the fibers reduces the length of the fibers and adversely affects the resiliency of the matted papers formed from the slurry. The slurry of mixed fibers is then pumped from the preparation tank or mixer to a conventional paper making screen, e.g. the screen of a Fourdrinier or a Rotoformer machine, and deposited onto the screen where the water is removed from the suspension by suction through the screen to form a wet laid fibrous matted paper on the screen. When intended for use as a battery separator, the matted paper is then processed through an acid bath to bond the fibers of the matted paper together. After the matted paper is formed and, in the case of battery separators, processed through an acid bath, the matted paper is dried and wound up into a roll or otherwise collected in a conventional manner for further processing, such as being cut into selected sizes for use as a battery separator.

These processes for forming thin, light weight matted paper, are costly and result in matted paper products which, due to the relatively short lengths of the fibers in the matted paper, caused at least in part by the stirring or agitation of the fibrous slurry in the preparation tank, exhibit only limited recovery after compression and low integrity. These matted paper products may also have openings through which active material growths or dendrites can form when these products are used as battery separators. Thus, for many end uses and, especially, for uses as separators for starved electrolyte batteries, such as starved electrolyte lead/acid batteries, the relatively high cost of such matted paper products and the limited recovery after compression, limited integrity and limited ability to prevent the formation of active material growths or dendrites exhibited by such products has resulted in the need for a low cost, resilient mat of relatively high integrity that is free or essentially free of openings through which active material growths or dendrites can easily pass between electrode plates.

SUMMARY OF THE INVENTION

The present invention relates to low cost, resilient, separator media especially suited for use as battery separators for starved electrolyte batteries, such as starved electrolyte lead/acid batteries and batteries including separators made from such low cost, resilient separator media. The resilient separator media are made from mats (preferably binderless) of air laid, randomly oriented, entangled microfibers, preferably glass microfibers. In addition to their resilience, the microfiber mats of the separator media of the present invention exhibit good integrity, are flexible and have an absence of openings passing directly through the mats between the major surfaces of the mats.

As used herein, the term "binderless mat(s)", means the absence of organic binders in the mats which would react with acids in the batteries where the mats are used as separators to give off gases or otherwise inhibit the performance of the batteries. As used herein, the term an "air laid fibrous mat(s)" means a fibrous mat(s) formed by collecting airborne microfibers into a mat of randomly oriented, entangled microfibers on a collection surface such as, a standard, moving foraminous collection conveyor. Such processes for forming mats are commonly termed air laid mat forming processes.

Where added tensile strength is required, the resilient air laid, fibrous mats forming the separator media may include one or two relatively high density, high tensile strength fibrous surface layer(s) or skin(s) and a relatively low density, more resilient fibrous layer integral with and, in one embodiment, intermediate the two surface layers. Preferably, the microfibers in the surface layer(s) or skin(s) of the mats are more entangled than the microfibers in the resilient layers to provide the mats with greater integrity.

Preferably, the surface layers or skins are formed on the resilient, air laid fibrous mats by subjecting one or both surfaces of an air laid, fibrous mat to hydroentanglement, as described in the Description of the Preferred Embodiments, to increase the entanglement of the fibers at and adjacent the major surface(s) of the mat relative to the entanglement of the fibers in a resilient fibrous layer. The further entanglement of the fibers at and adjacent the major surface(s) increases the tensile strength of the mat at its surface(s) and forms a skin or skins on the fibrous mat while retaining the resilience of the resilient fibrous layer so that the resilient, layered fibrous mat so formed has good integrity and retains its resilience after being subjected to repeated compression and expansion cycles, such as when used as an electrode plate separator in a sealed starved electrolyte battery. In addition, the skin(s) produced on the mats by hydroentanglement provide the separator media with smoother surfaces which result in improved machine handling and less damage to the media during processing subsequent to their manufacture.

The tensile strength of the fibrous mats may also be increased by needling the air laid fibrous mats, as described in the Description of the Preferred Embodiments, to further increase the entanglement of the microfibers throughout the thicknesses of the mats. The increased entanglement of the microfibers by needling, to provide the fibrous mat with greater integrity, may be performed in conjunction with the formation of skins on the fibrous mat by hydroentanglement. The tensile strength of this air laid fibrous mat may also be increased by using an acid solution as the liquid for performing the hydroentanglement or by subjecting the mat to an acid bath, e.g. with an acid having a ph of about 3, to hydrolyze the surfaces of the glass microfibers and bond the microfibers together at their points of intersection.

In another embodiment of the battery separator media of the present invention, the resilient fibrous mat is a resilient air laid felted fibrous mat of randomly oriented, entangled microfibers, e.g. glass microfibers, that preferably has a substantially uniform density throughout its thickness. This resilient fibrous mat is made by forming an air laid mat of randomly oriented, entangled microfibers; flooding the air laid fibrous mat with a liquid such as water or an acid solution; drawing a vacuum through the fibrous mat to remove the liquid from the fibrous mat and set its thickness; and drying the fibrous mat to form the resilient, air laid fibrous mat. When the air laid mat is flooded with the liquid, there is no mechanical manipulation of the microfibers, such as stirring or agitation, and the lengths of the microfibers in the mat are not reduced by the flooding of the mat. Thus, unlike the wet laid process for making matted paper described in connection with the prior art, the microfibers of the resilient fibrous mat of the present invention are not shortened by the stirring or agitation of the fibers during the process and the separator media of the present invention are more resilient than the prior art wet laid matted papers.

The tensile strength of this air laid fibrous mat may be increased by subjecting the mat to an acid bath or otherwise treating the mat with an acid solution, e.g. an acid having a ph of about 3, to hydrolyze the surfaces of the glass microfibers and bond the microfibers together at their points of intersection and/or the tensile strength of these mats may be increased by needling the fibrous mats to increase the entanglement of the microfibers throughout the thicknesses of the mats.

The average fiber lengths of the glass microfibers in three samples of the air laid, binderless mat of the present invention and a standard wet laid, glass fiber matted paper of the prior art were measured by the Bower-McNet testing procedure to determine their relative average lengths in millimeters. The average fiber lengths measured for three samples of the air laid, binderless mat of the present invention by the Bower-McNet method were 0.83 mm; 1.35 mm; and 2.28 mm. The average fiber length measured for the sample of the wet laid matted paper was only 0.44 mm. The presence of longer fibers in the air laid binderless mat of the present invention contribute to the greater integrity and tensile strength of the air laid binderless mat when compared to the wet laid matted paper of the prior art.

The invention is also directed to starved electrolyte batteries, such as starved electrolyte lead/acid batteries, which incorporate the resilient fibrous mats of the present invention in the cells of the batteries as separators between the electrode plates and as electrolyte reservoirs for maintaining electrolyte between and in contact with the electrode plates. In addition to maintaining contact between the electrolyte saturated separators and the major surfaces of the electrode plates to thereby maintain electrolyte in contact with the electrode plates, the resilience of the preferred resilient battery separators used in the batteries of the present invention apply a more uniform pressure to the major surfaces of the electrode plates to keep the active material of the electrode plates from separating from the grids of the electrode plates.

The preferred resilient separators used in the batteries also exhibit better wet thickness recovery than previous battery separators and thereby provide a faster and more uniform degree of electrolyte wetting. The faster and more uniform wetting exhibited by the preferred battery separators used in the batteries of the present invention may be quite beneficial especially when producing batteries with tall (e.g. 24 inch) and/or large cells. In addition, the more uniform dispersion of the electrolyte throughout the preferred battery separators may also increase the cell capacity and/or cycle service life of the battery cells and minimize corrosion within the battery cells.

As stated above, the resilience of the fibrous mat separators used in the batteries of the present invention, maintains electrolyte in contact with the major surfaces of the electrode plates. Preferably, by extending the separators of the present invention beyond the peripheries of the electrode plates, the resilience of these fibrous mat separators can also be utilized to form electrolyte reservoirs external to the cell plate stacks through the expansion of these unconfined portions of the separators (the "mushroom effect"). The formation of these external electrolyte reservoirs through the mushroom effect may increase the cell capacities and/or cycle service life of the cells in the batteries of the present invention. The resilience of the preferred battery separators used in the batteries of the present invention may also improve the ability of the cells to withstand vibrational conditions without appreciable damage to the electrode plate stacks.

The preferred resilient fibrous mat separators used in the batteries of the present invention improve the handleability of the plate stacks during the assembly of the plate stacks and the battery cells. The preferred resilient fibrous mat separators used in the batteries of the present invention are more flexible and have greater tensile strength than the prior art battery separator mats discussed above in the background of the invention. In cell stacks, battery separators are often wrapped or folded about lower edges of at least some of the electrode plates to provide separator material on both major surfaces of the electrode plates. The flexibility and tensile strength of the resilient fibrous mat separators used in the batteries of the present invention, enable these separators to be more easily folded about the edges of the electrode plates in a cell stack without tearouts or other failures of the battery separator material.

The resilient fibrous mat separators of the present invention can withstand greater elongation without rupture or tearouts than the current commercial matted paper separator materials discussed above in the background of the invention. When measured, resilient, air laid, binderless fibrous mat separators of the present invention with hydroentangled surface layers withstood an elongation of from about 2.82% to about 6.44% prior to experiencing failure or rupture while the current matted paper separator materials withstood an elongation of only about 0.73% prior to failure or rupture. The greater elongation, prior to rupture or failure, of the air laid fibrous mats of the present invention enable these mats to be more readily folded about electrode plates without tearing. The elongation of the mats was measured by subjecting the mats to increased tensile loading and measuring the elongation of the mats as the tensile loading increased until at a certain degree of elongation the tensile loading required to further elongate the mat dropped off indicating that the mat had experienced a rupture or failure and was tearing or pulling apart.

The texture of the major surfaces of the resilient fibrous mat separators used in the present invention, especially those which have been subjected to hydroentanglement, facilitates the sliding of the electrode plates relative to the separators. This permits the electrode plates and intermediate separators to be easily and quickly formed into a stack for assembly into a battery cell and also permits the electrode plates in a plate stack to be easily and quickly realigned should the plates move out of alignment during the assembly of a plate stack or the insertion of a plate stack into a battery cell.

For comparable thicknesses, the preferred resilient fibrous mat separators used in the batteries of the present invention, use about 20% less material than prior art battery separator mats discussed above in the background of the invention and provide larger reservoirs for the electrolyte used in the batteries than the prior art battery separator mats (less volume occupied by fibers and more volume occupied by the electrolyte).

DESCRIPTION OF THE PREFERRED EMBODIMENTS

Figure 1:
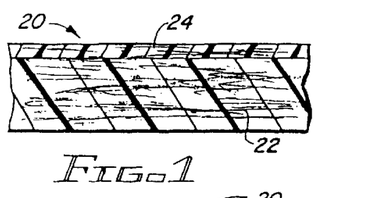
FIG. 1 is an enlarged, cross sectional view through the first embodiment of the resilient fibrous mat of the present invention which has a single surface layer or skin of more entangled fibers.
Figure 2:
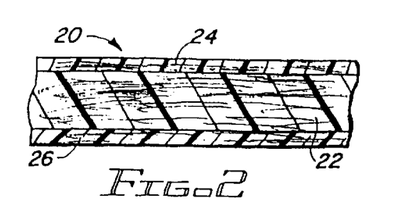
FIG. 2 is an enlarged, cross sectional view through the second embodiment of the resilient fibrous mat of the present invention which has two surface layers or skins of more entangled fibers.
Figure 3:
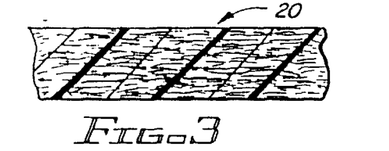
FIG. 3 is an enlarged, cross sectional view through the third embodiment of the resilient fibrous mat of the present invention which in not provided with surface layers or skins of more entangled fibers.

FIGS. 1, 2 and 3 show three embodiments of the resilient fibrous mats 20 which form the resilient battery separator media of the present invention. The embodiment of FIG. 3 shows the resilient fibrous mat 20 without skins or surface layers to provide the resilient fibrous mat with added integrity and tensile strength. The embodiment of FIG. 1 includes a resilient layer 22 and one surface layer or skin 24 to provide the resilient fibrous mat with added integrity and tensile strength. The embodiment of FIG. 2 includes a resilient layer 22 and two surface layers or skins 24 and 26 which provide the resilient fibrous mat 20 with additional integrity and tensile strength.

In the embodiment of FIG. 3, the resilient fibrous mat 20 is a resilient, air laid, fibrous mat 20 (preferably binderless) of randomly oriented, entangled microfibers. The resilient fibrous mat 20 is uniform or essentially uniform in density throughout its thickness and the fiber entanglement within the resilient fibrous mat is uniform or essentially uniform throughout its thickness and provides the fibrous mat with the integrity and tensile strength required for its application as a battery separator media. While the fiber entanglement present in the air laid, fibrous mat 20 is sufficient for certain battery separator applications, for other battery separator applications the tensile strength and integrity of the mat must be increased.

Figure 5:
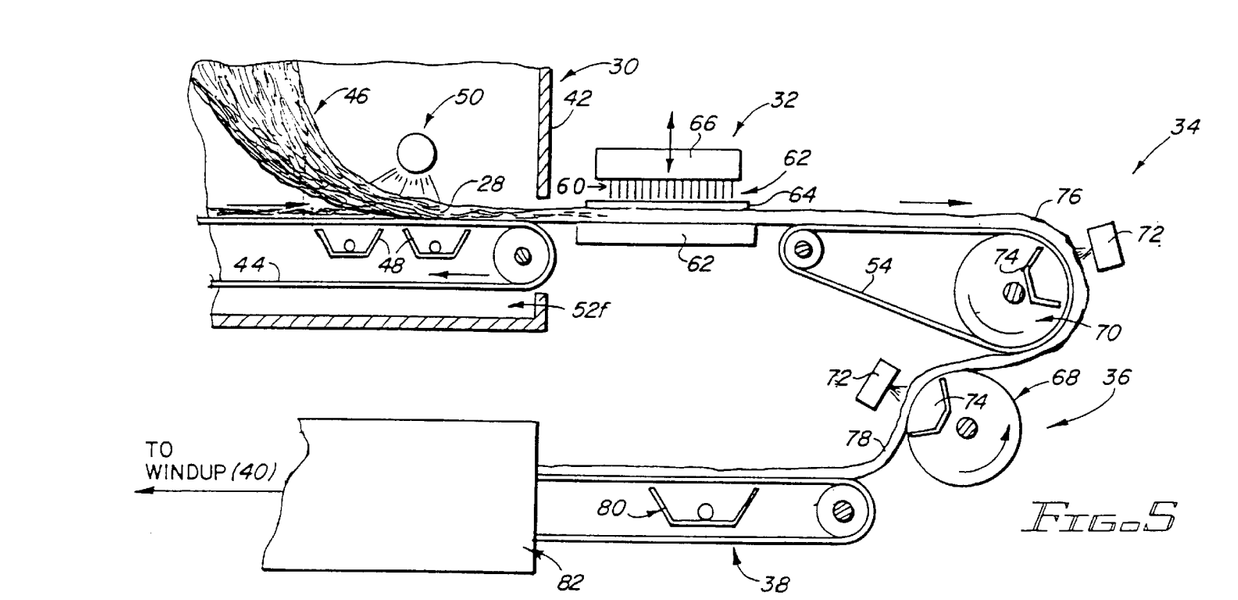
FIG. 5 is a schematic view of a first production line for making the resilient fibrous mats of FIGS. 1 to 3.
Figure 6:
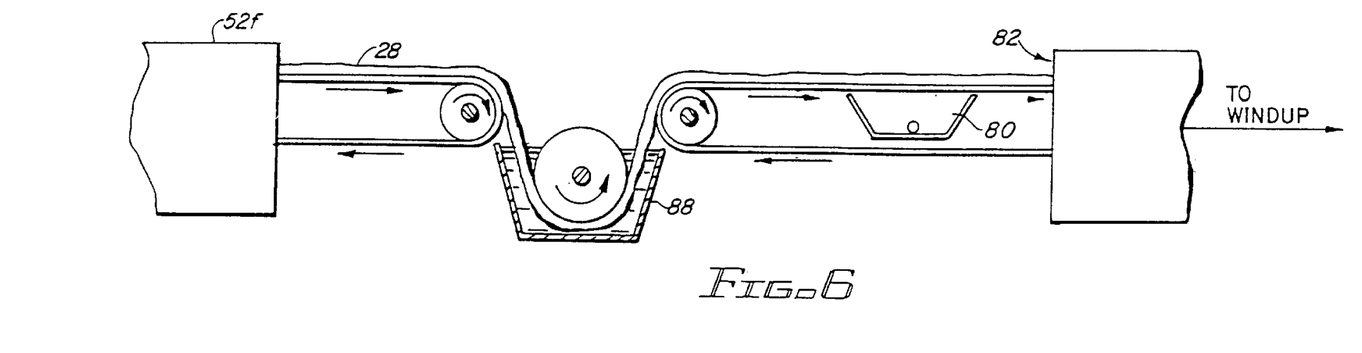
FIG. 6 is a schematic view of a second production line for making the resilient fibrous mat of FIG. 3.

The tensile strength of the air laid, fibrous mat 20 of FIG. 3 may be increased while maintaining a substantially constant density across its thickness: by flooding the mat with water as schematically shown in FIG. 6 and drawing a vacuum through the mat to felt the mat; by applying an acid solution to the mat to hydrolyze the surfaces of the glass microfibers and bond the microfibers together at their points of intersection, e.g. using an acid solution having a ph of about 3 rather than water to flood the mat when felting the mat; and/or by needling the fibrous mats as schematically shown in FIG. 5 to increase the entanglement of the microfibers throughout the thicknesses of the mats.

The tensile strength and integrity of the air laid, fibrous mat 20 (preferably binderless mat) may also be increased by forming an integral surface layer or skin 24 or integral surface layers or skins 24 and 26 on the air laid fibrous mat 20 having greater fiber entanglement and density than the original air laid fibrous mat 20. The more compact, denser surface layers 24 and 26 of the embodiments of FIGS. 1 and 2 increase the tensile strength of the resilient fibrous mat 20 and also increase the tear resistance of one or both surfaces of the resilient fibrous mat 20 while the less entangled fibers of the less compact, less dense, resilient layer 22 provide the resilient fibrous mat with the required resilience. The formation of these skin(s) on surface layer(s) on the air laid fibrous mat 20 to increase the tensile strength of the mat may be performed in conjunction with the needling of the mat to further entangle the fibers and/or the hydrolyzation of the fiber surfaces within the mat with an acid solution to bond the fibers together at their points of intersection to increase the tensile strength of the air laid fibrous mat 20.

Where the resilient fibrous mat 20 is provided with two surface layers 24 and 26, the degree of fiber entanglement and the density of these two surface layers is normally equal or substantially equal. However, if desired, one surface layer can have greater fiber entanglement; be more compact; and have a greater density than the other surface layer. A resilient fibrous mat with surface layers of different densities may be beneficial for certain applications. For example, it might be beneficial in certain applications to have battery separators wherein the surface layers contacting the electrode plates of one polarity have a greater density than the surface layers contacting the electrode plates of the opposite polarity.

Preferably, the resilient air laid, fibrous mats 20 of FIGS. 1–3 are binderless and made with glass microfibers. However, it is contemplated that for certain applications the resilient fibrous mat 20 can be made of various fibers or mixtures of fibers, including but not limited to, glass microfibers; polyester, polypropylene and other polymeric fibers; and cellulose fibers. Unlike the wet laid, matted paper battery separators of the prior art which are made by combining batches of fibers having different fiber diameter sizes, the air laid, fibrous mat 20 is preferably made from fibers having a uniform fiber diameter size. However, if desired, the fiber diameter size of the fibers used to form the fibrous mat 20 may be varied within a preferred range.

The fiber diameters of the glass microfibers used to form the resilient, air laid, fibrous mat 20 can also vary. However, for making resilient fibrous mats particularly suited for applications such as battery separators, for sealed, starved electrolyte, lead/acid batteries, it is preferred to use glass microfibers having a mean fiber diameter between about 0.5 and about 2.0 microns; more preferably between about 1.2 and about 1.7 microns; and most preferably about 1.4 microns. In this preferred embodiment, the resilient fibrous mats 20 range in weight from about 50 to about 450 grams per square meter; and more preferably from about 75 to about 150 grams per square meter. While the thicknesses and weights of the resilient fibrous mats 20 can vary, for uses such as battery separators, for starved electrolyte batteries, the resilient fibrous mats 20, in an uncompressed state, range in thickness from about 0.01 to about 0.5 inches and preferably, from about 0.05 to about 0.25 inches.

Figure 4:
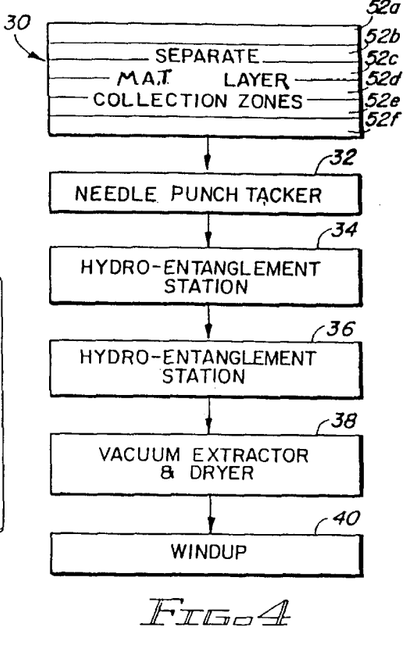
FIG. 4 is a block flow diagram of a first method of forming the resilient fibrous mat of the present invention.

As shown in the block flow diagram of FIG. 4 and the schematic diagram of FIG. 5, one method for forming the resilient, fibrous mat 20 of the present invention, includes forming a fibrous mat 28 of randomly oriented, entangled fibers in a mat forming station or stations 30 by an air laid mat forming process. The fibrous mat 28 may be formed with or without an organic binder bonding the fibers of the mat together at their points of intersection. If greater integrity and tensile strength is required for the battery separator media application, the fibrous mat 28 is needle punched in a needle punch tacking station 32 and/or skin(s) or surface layer(s) are formed on the fibrous mat 28 by passing the air laid mat through one or two hydroentanglement stations 34 and 36 to further entangle the fibers at and adjacent one or both surfaces of the mat. If desired, the liquid used to perform the hydroentanglement can be an acid solution, e.g. an acid having a ph of about 3, which also hydrolyzes the surfaces of the microfibers to bond the microfibers together at their points of intersection. The resilient fibrous mat 20 thus formed is dried by passing the resilient fibrous mat 20 through a vacuum extractor and a conventional dryer or oven 38; and the resilient fibrous mat 20 is then collected for storage, shipment or further processing in a windup station 40 or the like.

It is preferred to use an air laid process for forming the fibrous mat 28 rather than a wet laid process for several reasons. In air laid processes for forming the fibrous mat 28, unlike wet laid processes, there is no stirring or agitation of the fibers to disperse the fibers in a slurry (hydropulping of the fibers). The hydropulping of the fibers in wet laid processes breaks the fibers into shorter lengths thereby reducing the degree of fiber entanglement in the mat, the resilience of the mat and the tensile strength of the mat. In the air laid processes, the fibers can be produced by a fiberizer and collected with the fibers randomly oriented and entangled to form the fibrous mat 28 without any hydropulping of the fibers.

As discussed above, the average fiber length of the glass microfibers in three samples of the air laid, fibrous mat 20 of the present invention and a wet laid, glass fiber matted paper of the prior art were measured by the Bower-McNet testing procedure to determine their relative lengths in millimeters. The average fiber lengths for the three samples of the air laid, fibrous mat 20 of the present invention were 0.83 mm; 1.35 mm and 2.28 mm. The average fiber length of the fibers in the wet laid matted paper was only about 0.44 mm. Preferably, the average length of the fibers in the air laid, fibrous mat 20 of the present invention, as measured by the Bower-McNet testing procedure, is about 0.8 mm or greater.

The preferred fibers, for use in forming the fibrous mat 28 of randomly oriented entangled fibers, are flame attenuated glass microfibers. Various glass compositions may be used to form the microfibers, including but not limited to, glass compositions which are highly biosoluble yet resistant to attack by moisture and acids. These fibers are formed by drawing continuous primary glass filaments from a conventional feeder or pot of molten glass and introducing these continuous primary glass filaments into the high energy gaseous blast of a flame attenuation burner, e.g. a Selas burner, where the continuous filaments are reheated, attenuated, and formed into fine diameter staple glass microfibers of the desired mean diameter. While flame attenuated glass microfibers are preferred, other fibers may be used with or instead of the flame attenuated glass fibers to form the fibrous mat 28, such as but not limited to, glass fibers produced on rotary fiberization processes, and polyester, polypropylene and other polymeric fibers including melt blown polymeric fibers and mixtures of such fibers. It is contemplated that cellulose fibers may also be included in the fibers of the fibrous mat 28 as part of a mixture of fibers.

FIG. 5 shows a partial schematic view which is representative of a production line for making the resilient, air laid, fibrous mat 20 of the present invention by the method of this invention outlined in the block diagram of FIG. 4. FIG. 5 shows the downstream end of a collection chamber 42 with the air laid, fibrous mat 28 exiting the collection chamber 42 on a collection chain conveyor 44 which can be horizontal, as shown, inclined or vertical. The microfibers 46, produced by a flame attenuation process or other process, are drawn to the collection chain conveyor 44 by suction ducts 48 positioned beneath the upper conveyor flight and collected on the upper flight of the collection chain conveyor 44 to form the fibrous mat 28. If desired, a binder can be applied to the microfibers, e.g. by spraying the binder onto the airborne microfibers in the collection chamber before the microfibers are collected. If needed, the microfibers can be sprayed with water from a series of spray nozzles 50 extending transversely across the conveyor 44 to enable the vacuum or suction being drawn by the suction ducts to slightly compact the air laid fibrous mat 28, further entangle the microfibers, and provide the fibrous mat 28 with greater integrity.

As shown in the block flow diagram of FIG. 4, in a preferred method of forming the air laid, fibrous mat 28, the fibrous mat 28 is formed of between two and six thin fibrous mat layers which are produced in each of the mat collection zones or modules 52a–52f. In this method, a thin fibrous mat base layer is air laid and collected on a collection conveyor in one of the mat collection zones 52a through 52e and then one or more additional thin fibrous mat layers are subsequently and successively collected, in one or more of collection zones 52b through 52f, directly on the previously laid thin fibrous mat layer or layers to form the fibrous mat 28. Thus, while the fibrous mat 28 can be produced in only one collection zone, the fibrous mat 28 can also be produced in two or more collection zones (preferably up to but not limited to six collection zones). For example, a mat weighing 125 grams per square meter can be made in one collection zone or five collection zones with each zone producing a thin fibrous mat layer weighing about 25 grams per square meter.

The suction from the suction ducts 48 drawing the microfibers 46 toward a collection conveyor entangles the microfibers being collected with the microfibers of the layer upon which these fibers are collected to form an integral mat and draws the fibers more strongly toward areas of the collection conveyor surface with the least amount of fibers thereon. Thus, by forming the fibrous mat 28 from a series of thin fibrous mat layers, collected successively one upon the other, the fibers of each successive thin fibrous mat layer are drawn toward areas of the collection surface least covered by previously collected thin fibrous mat layers thereby preventing or minimizing the formation of a fibrous mat 28 with holes passing directly through the mat from one major surface to the other. Instead, the randomly oriented, entangled fibers of the thin fibrous mat layers forming the fibrous mat 28 create a tortuous path through the fibrous mat. Thus, when using the resilient fibrous mat 20 made from the mat 28 as a battery separator, clear openings for the formation of active material growths or dendrites between the electrode plates are not present and the formation of active material growths or dendrites between the electrode plates is retarded.

In another preferred method for making the mat 28, a thin fibrous mat base layer is air laid and collected on a collection conveyor in one of the mat collection zones 52a through 52e and then one or more additional thin fibrous mat layers are separately collected on separate collection conveyors in one or more of collection zones 52b through 52f. The thin fibrous mat layers starting with the base layer are transferred from their separate collection conveyors to a common combining conveyor where the mat layers from the one or more collection zones 52b through 52f are laid directly on the previously laid thin fibrous mat layer or layers carried by the combining conveyor to form the fibrous mat 28. U.S. Pat. No. 4,120,676, issued Oct. 17, 1978, shows an apparatus of the general type which can be used to form the mat 28 with individual collection modules where mat layers are individually collected and then combined on a common conveyor to form a mat and its disclosure is hereby incorporated by reference. By superimposing the separately formed thin mat layers to form the fibrous mat 28, the randomly oriented, entangled fibers of the thin fibrous mat layers forming the fibrous mat 28 create a tortuous path through the fibrous mat. Thus, as with the other embodiment of the method of making the fibrous mat 28 described above, when the resilient fibrous mat 20 made from the mat 28 is used as a battery separator, clear openings for the formation of active material growths or dendrites between the electrode plates are not present and the formation of active material growths or dendrites between the electrode plates is retarded.

As shown in FIG. 5, when forming the resilient fibrous mats 20 of FIGS. 1 and 2, the continuous, fibrous mat 28 passes from the collection chamber 42 of fiberizing or mat forming station(s) 30 through the needle punch tacking station 32. When required, the needle punch tacking station 32 is used in the method of the present invention to give the fibrous mat 28 additional integrity. When the needle punch tacking station 32 is used in the manufacturing process, the fibrous mat 28 is periodically needle punched as the fibrous mat moves through the needle punch tacking station from the wire screen conveyor 44 to a wire screen conveyor 54. During each needle punching cycle, barbed needles are passed down through the fibrous mat 28 and then retracted up through the fibrous mat 28 to further entangle the randomly oriented fibers, e.g. glass microfibers, in the mat 28 and give the fibrous mat 28 more integrity.

The needle punch tacking station 32 has a needle punch 60, such as a Fehrer needle punch, capable of up to 2500 needle punches per minute. The needle punch 60 typically includes a lower, fixed perforated bed plate 62; an upper, vertically adjustable perforated stripper plate 64; and a needle board 66 with barbed needles (preferably 36 gauge star blade needles) depending therefrom, in a preselected pattern, in alignment with the perforations in the upper stripper plate 64 and the lower bed plate 62. In operation, the fibrous mat 28 slides over the lower, fixed perforated bed plate 62 from conveyor 44 to conveyor 54. The lower, fixed perforated bed plate 62 supports the fibrous mat 28 during the needle punching operation and the perforations in the bed plate 62 receive the points of the needles when the needles project through the fibrous mat 28 during the needle punching operation. The upper, vertically adjustable perforated stripper plate 64 is adjusted to a predetermined spacing above the lower bed plate 62, less than the thickness of the mat 28, and is fixed in that position to maintain the fibrous mat 28 in a slightly compressed state during the needle punching operation. The needles depending from the needle board 66 pass down and back through the perforations in the stripper plate 64 during the needling or tacking of the fibrous mat 28.

The needle board 66 is driven by a conventional reciprocating drive mechanism which reciprocates the needle board 66 in a vertical direction as shown in FIG. 5. As portions of the fibrous mat 28 move through the needle punch tacking station, the needle board 66 is moved down passing the barbed needles down through the perforations in the stripper plate 64, the fibrous mat 28, and into the perforations in the bed plate 62. The needle board 66 is then retracted to its original position drawing the barbed needles back up through the fibrous blanket 28 and the perforated stripper plate 64. The passage of the barbed needles down and back through the fibrous blanket 28 further entangles the fibers of the blanket 28 to give the fibrous blanket 28 greater integrity.

From the needle punch tacker station 32, if used, the air laid, (preferably binderless) fibrous mat 28 passes through two conventional hydroentanglement units 68 and 70 (such as the JET LACE 2000 hydroentanglement units sold by Valmet Honeycomb Corporation) of the hydroentanglement stations 34 and 36. Preferably, each of the hydroentanglement units 68 and 70 includes a liquid jet unit 72 for applying jets or streams of pressurized water or acid solution into and across the width of a major surface of the mat, a vacuum suction unit 74, and a carrier screen for carrying the fibrous mat 28. The vacuum suction units 74 are positioned opposite the liquid jet units 72 and the fibrous mat 28 is passed between the water jet unit 72 and the vacuum suction unit 74 of each of the hydroentanglement units 68 and 70. As shown in FIG. 5, the first hydroentanglement unit 68 is positioned to direct jets of liquid into the fibrous mat 28 through one major surface 76 of the fibrous mat and to withdraw liquid from the fibrous mat 28 through the other major surface 78 of the fibrous mat and the second hydroentanglement unit 70 is positioned to direct jets of liquid into the fibrous mat 28 through the other major surface 78 of the fibrous mat and to withdraw liquid from the fibrous mat 28 through the major surface 76 of the fibrous mat. Where the resilient fibrous mat 20 is provided with two surface layers 24 and 26, as shown in FIG. 2, the fibrous mat 28 is subjected to hydroentanglement by both hydroentanglement units 68 and 70. Where only one major surface of the fibrous mat 28 is provided with a surface layer, such as layer 24 as shown in FIG. 1, only one of the hydroentanglement units is used. The hydroentanglement units 68 and 70 form the surface layers 24 and/or 26 by further entangling the fibers of the fibrous mat at and adjacent the major surfaces 76 and 78 of the mat relative to the fiber entanglement of the fibers in the resilient layer 22 and the force of the liquid jets of each hydroentanlgement unit is set or regulated to achieve the desired degree of added fiber entanglement to form the surface layer(s). After passing through the hydroentanglement stations 34 and 36, the fibrous mat 28 is dried, preferably by passing the fibrous mat 28 through a vacuum extractor 80 and an oven 82 to complete the formation of the resilient fibrous mat 20.

The resilient, fibrous mat 20 (preferably binderless) may also be formed as schematically shown in FIG. 6. In this process, the fibrous mat 20 is made by forming an air laid mat 28 of randomly oriented fibers, e.g. glass microfibers, as described in connection with FIGS. 4 and 5. As shown in FIG. 6, the fibrous mat 28 is then passed through a liquid bath 88, e.g. a water or acid bath, where it is saturated or flooded with water or an acid solution. The saturated mat 28 is then passed through a vacuum extractor 80 on a wire screen conveyor. The vacuum extractor 80 draws a vacuum through the fibrous mat to remove the water or acid solution from the fibrous mat, further entangle the fibers and set its unloaded thickness. The fibrous mat 28 is then dried in the oven 82 or other conventional dryer means to complete the formation of the resilient fibrous mat 20. As discussed above, there is no hydropulping of the fibers in this process and the fibrous mat 20 formed has much greater resilience than prior art matted papers formed by wet laid processes.

When air laid, binderless, fibrous mats 20 of the present invention, with hydroentangled surface layers or skins, were compared with a standard, prior art wet laid, matted paper, the following results were obtained which show that, for comparable weights (set forth in the last column), the air laid, binderless, fibrous mats 20 of the present invention have greater resilience than the prior art wet laid matted papers.

| MATERIAL | BASIS WT. gm/m$^2$ | THICKNESS MILS 0.6 KPa | THICKNESS MILS 10 KPa | COMPRESSION RECOVERY RATIO | THICKNESS MILS 160 gm/m$^2$ @ 10 KPa |
|---|---|---|---|---|---|
| Air Laid | 163 | 71 | 46 | 1.54 | 45 |
| Air Laid | 155 | 48 | 35 | 1.37 | 37 |
| Air Laid | 158 | 43 | 32 | 1.34 | 32 |
| Wet Laid | 180 | 42 | 32 | 1.31 | 28 |

As discussed above, air laid, binderless mats 20 of the present invention and the resilient fibrous mat separators made from those mats can withstand greater elongation without rupture or failure than the current commercial matted paper separator materials discussed above in the background of the invention. When measured, three resilient, air laid, binderless fibrous mats 20 of the present invention with hydroentangled surface layers withstood elongations of 2.82%; 4.51%; and 6.44% prior to experiencing failure or rupture while a current standard, wet laid, matted paper separator material withstood an elongation of only about 0.73% prior to failure or rupture. The greater elongation, prior to rupture or failure, of the air laid binderless fibrous mats of the present invention enable these mats to be more readily folded about electrode plates without tearing than the wet laid matted paper separators. Preferably, the air laid, fibrous mats 20 can experience an elongation of at least 2% prior to failure and most preferably an elongation of at least 2.8% prior to failure.

Figure 7:
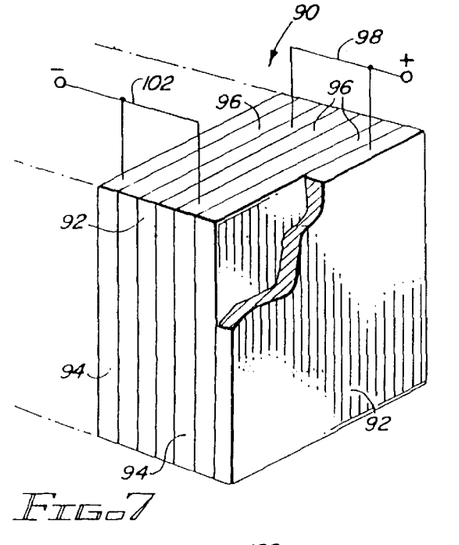
FIG. 7 is a schematic of a starved electrolyte battery with a portion broken away to show the resilient fibrous mats of the present invention positioned between the positive and negative electrode plates.
Figure 8:
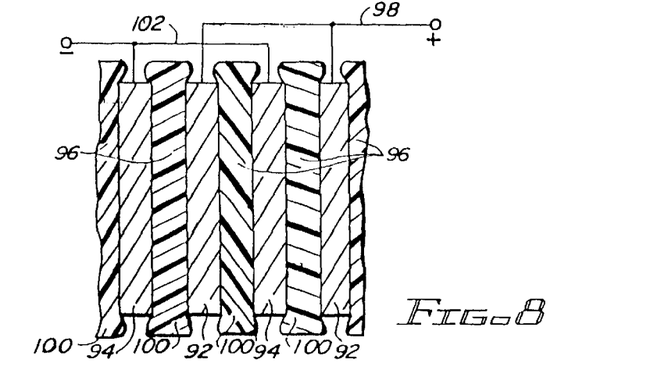
FIG. 8 is a schematic of a starved electrolyte battery showing the resilient fibrous mats of the present invention positioned between the positive and negative electrode plates and extending outward beyond the electrode plates to form electrolyte reservoirs beyond the peripheral edges of the electrode plates.

FIGS. 7 and 8 are schematic figures showing the resilient fibrous mats 20 of the present invention used as resilient separators and electrolyte reservoirs 96 (hereinafter referred to as "separators") in a starved electrolyte battery 90, such as, a starved electrolyte lead/acid battery. The starved electrolyte battery 90 includes a container (not shown) in which are positioned one or more cells connected in series. Each cell includes one or more positive electrode plates 92; one or more negative electrode plates 94; one or more resilient separators 96 interposed between the positive electrode plates 92 and the negative electrode plates 94; an electrolyte absorbed in the positive and the negative electrode plates and the separators 96; a positive electrode lead 98 joining the positive electrode plates 92 to an adjoining cell or the positive battery terminal; and a negative electrode lead 102 joining the negative electrode plates 94 to an adjoining cell or a negative battery terminal.

The resilient separators 96 are made from the resilient fibrous mats 20 of FIGS. 1, 2 and 3, which may be cut to the shape and size of the electrode plates 92 and 94 as shown in FIG. 7 or oversized, as shown in FIG. 8, to extend beyond the electrode plates.

Where the separators 96 are made from the resilient fibrous mats 20 of FIGS. 1 or 2, each separator includes a resilient layer 22 and either one surface layer 24 or two surface layers 24 and 26 which provide the separators 96 with additional integrity. The fibers in the surface layer 24 or layers 24 and 26 are more entangled than the fibers in the resilient layer 22 and the surface layer 24 or layers 24 and 26 are more compact and have a greater density than the resilient layer 22. The more compact, denser surface layers 24 and 26 increase the tensile strength of the separators 96 and also increase the tear resistance of one or both surfaces of the separators 96 while the less entangled fibers of the less compact, less dense, resilient layer 22 provide the separators 96 with the required resilience and electrolyte retaining capacity. Where the resilient separator 96 is provided with the two surface layers 24 and 26, as shown in FIG. 2, the degree of fiber entanglement and the density of these two surface layers can be equal or one surface layer can have greater fiber entanglement and be more compact and denser than the other surface layer. Where the separators 96 are made from the resilient fibrous mats 20 of FIG. 3, the separators 96 have one resilient layer which is essentially uniform in density and fiber entanglement throughout its thickness.

In one application of the present invention, the resilient separators 96 are made of glass microfibers, polymeric microfibers or cellulose fibers or mixtures thereof and most preferably from glass microfibers. In this application, the glass microfibers and the polymeric microfibers of the resilient separators 96 have mean fiber diameters between about 0.5 and about 2.0 microns; more preferably between about 1.2 and about 1.7 microns; and most preferably about 1.4 microns. In this application, the resilient separators 96 range in weight from about 50 to about 450 grams per square meter; and more preferably from about 75 to about 150 grams per square meter. Preferably, the resilient separators 96 are binderless. In addition, the resilient separators 96 are free of openings passing directly through the resilient separators through which active material growths or dendrites can easily form between the electrode plates.

As assembled, the positive electrode plates 92 and the negative electrode plates 94 in the cell or cells of the battery are spaced from each other a selected distance e.g. about 0.1 to about 0.2 inches. Over the service life of the battery, the electrode plates 92 and 94 repeatedly expand when the battery is in use, due to changes in morphology resulting from the chemical reaction producing the electrical energy, and then contract when the battery is recharged.

The resilient separators 96, when subjected to a loading normal to their major surfaces of 1.5 pounds per square inch (hereinafter "1.5 psi"), have thicknesses about equal to (100% of the selected distance) or greater than the selected distance between the electrode plates 92 and 94 of the battery cell(s) as assembled; preferably between about 110% and about 250% of the selected distance between the electrode plates 92 and 94 of the battery cell(s) as assembled; and more preferably between about 120% and about 250% of the selected distance between the electrode plates 92 and 94 of the battery cell(s) as assembled.

Thus, the resilient separators 96 of starved electrolyte, lead/acid batteries 90 function as both: a) resilient separators between the positive and negative electrode plates 92 and 94 of the cells to maintain the spacings between the positive and negative electrode plates 92 and 94 and prevent the formation of short circuits within the cells; and b) reservoirs for retaining electrolyte within the cells between the positive and negative electrode plates 92 and 94. Where the resilient separators 96 extend beyond the perimeters or peripheries of the electrode plates 92 and 94 and are free to expand as shown in FIG. 8, the resilient separators expand, e.g. to thicknesses equal to 110% or 120% or more of the spacing between the electrode plates as assembled, to form extended reservoirs 100 and thereby increase the electrolyte retaining capacity of the resilient separators 96 and the capacity of the battery. Due to their lack of resilience, the prior art separators made form wet laid mats do not provide this increased electrolyte retaining capacity.

Due to their resilience, the resilient separators 96 help prevent short circuits within the cells which can occur due to direct contact between the positive and negative electrode plates when the spacing between the electrode plates is not maintained. Since the resilient separators 96 are free of openings passing directly through the resilient separators between their major surfaces, the resilient separators 96 help to prevent short circuits within the cells due to the formation of active material growths or dendrites of the electrode materials between the positive and negative electrode plates. In the embodiments of the mat shown in FIGS. 1 and 2, the denser surface layer 24 or layers 24 and 26 of the resilient separators 96 provide the resilient separators 96 with sufficient integrity to resist tearing during the handling of the resilient separators 96 and the assembly of resilient separators 96 into the battery cells. Without the increased integrity provided by the surface layer or layers, the handling of the separators during their assembly into battery cells could form openings in the resilient separators 96 through which active material growths or dendrites between the electrode plates could easily form.

In addition, the texture of the major surfaces of the resilient fibrous mat separators used in the present invention, especially those which have been subjected to hydroentanglement, are relatively smooth. These smooth surfaces facilitate the movement of the electrode plates over the major surfaces of the separators 96. This permits the electrode plates and intermediate separators to be easily and quickly formed into a stack for assembly into a battery cell and also permits the electrode plates in a plate stack to be easily and quickly realigned should the plates move out of alignment during the assembly of a plate stack or the insertion of a plate stack into a battery cell.

As previously discussed, the resilient separators 96, in starved electrolyte batteries, such as starved electrolyte lead/acid batteries, also function as electrolyte reservoirs and the capacity of such batteries is a function of both the surface areas of the electrode plates and the surface areas of the separators in contact with the surfaces of the electrode plates. The resilience of the resilient separators 96 maintains the electrolyte between the positive and negative electrode plates of the batteries and maintains the major surfaces of the resilient separators 96 and the electrolyte carried by the separators in contact with the major surfaces of the electrode plates as the resilient separators 96 continue to recover in thickness after the repeated expansion and contraction of the electrode plates over the service life of such batteries.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A resilient battery separator medium comprising:
a resilient, air laid, fibrous mat of randomly oriented, entangled microfibers; the air laid, fibrous mat having a weight between 75 and 150 grams per square meter and a thickness between 0.05 and 0.25 inches; the microfibers having a mean diameter between 1.2 and 1.7 microns; and the air laid, fibrous mat having first and second major surfaces for contacting major surfaces of electrode plates of a battery in which the air laid, fibrous mat is installed; the air laid, fibrous mat having a thickness, when subjected to a loading of 1.5 psi, greater than a spacing between the electrode plates between which the air laid, fibrous mat is to be installed; and the air laid, fibrous mat having a resilience which allows the separator medium to maintain contact with the electrode plates while undergoing repeated compressions and expansions, in a direction perpendicular to the major surfaces of the air laid, fibrous mat, when the electrode plates expand and contract during the service life of the battery.

2. The battery separator medium according to claim 1, wherein: the air laid, fibrous sheet consists essentially of glass microfibers.

3. The battery separator medium according to claim 1, wherein: the air laid, fibrous mat is binderless.

4. The battery separator medium according to claim 1, wherein: the microfibers of the air laid, fibrous mat have an average length, as measured by the Bower-McNet test method, of at least 0.8 mm.

5. The battery separator medium according to claim 1, wherein: the air laid, fibrous mat can withstand an elongation of at least 2% prior to failure.

6. The battery separator medium according to claim 1, wherein: the air laid, fibrous mat has a thickness, when subjected to a loading of 1.5 psi, that is at least 110% of the spacing between the electrode plates of the battery.

7. The battery separator medium according to claim 1, wherein: the air laid fibrous mat has a thickness, when subjected to a loading of 1.5 psi, that is at least 120% of the spacing between the electrode plates of the battery.

8. The battery separator medium according to claim 1, including means to increase the tensile strength of the air laid fibrous mat.

9. The battery separator medium according to claim 8, wherein: the means to increase the tensile strength of the air laid, fibrous mat comprises microfibers within the air laid, fibrous mat bonded together at their points of intersection by hydrolyzation of the microfiber surfaces.

10. The battery separator medium according to claim 8, wherein: the means to increase the tensile strength of the air laid fibrous mat comprises needle entangled microfibers throughout the thickness of the air laid, fibrous mat.

11. The battery separator medium according to claim 10, wherein: the air laid, fibrous mat is binderless.

12. The battery separator medium according to claim 8, wherein: the means to increase the tensile strength of the air laid fibrous mat comprises a first fibrous skin layer integral with a resilient fibrous layer more resilient than the first fibrous skin layer; the fibrous skin layer having a greater density and tensile strength than the resilient fibrous layer.

13. The battery separator medium according to claim 12, wherein: the means to increase the tensile strength of the air laid fibrous mat includes a second fibrous skin layer integral with the first fibrous skin layer and the resilient fibrous layer; the resilient fibrous layer being more resilient than the second fibrous skin layer and intermediate the first and second fibrous skin layers; and the second fibrous skin layer having a greater density and tensile strength than the resilient fibrous layer.

14. The battery separator medium according to claim 12, wherein: microfibers in the first fibrous skin layer are more entangled than microfibers in the resilient fibrous layer.

15. The battery separator medium according to claim 14, wherein: the microfibers in the first fibrous skin layer are hydroentangled.

16. The battery separator medium according to claim 15 wherein: the air laid, fibrous mat is binderless.

17. A resilient battery separator medium for use in starved electrolyte batteries comprising:
a resilient, air laid, fibrous mat of randomly oriented, entangled glass microfibers; the air laid fibrous mat having a weight between 75 and 150 grams per square meter and a thickness between 0.05 and 0.25 inches; the air laid, fibrous mat being binderless; the microfibers having a mean diameter of 1.4 microns and an average length, as measured by the Bower-McNet test method, of 0.8 mm; the air laid, fibrous mat being capable of experiencing an elongation of at least 2% prior to failure; and the air laid, fibrous mat having first and second major surfaces for contacting major surfaces of electrode plates of a battery in which the air laid, fibrous mat is installed; the air laid, fibrous mat having a thickness, when subjected to a loading of 1.5 psi, greater than a spacing between the electrode plates between which the air laid, fibrous mat is to be installed; and the air laid, fibrous mat having a resilience which allows the separator medium to maintain contact with the electrode plates while undergoing repeated compressions and expansions, in a direction perpendicular to the major surfaces of the air laid, fibrous mat, when the electrode plates expand and contract during the service life of the battery.

18. In a starved electrolyte battery including a container in which is positioned at least one positive electrode plate; a least one negative electrode plate; a separator interposed between the positive and the negative electrode plates; an electrolyte absorbed in the positive and negative electrode plates and the separator; a positive electrode lead joining the at least one positive electrode plate to a positive battery terminal; a negative electrode lead joining the at least one negative electrode plate to a negative battery terminal; the improvement comprising:
the separator comprising a resilient, air laid, fibrous mat of randomly oriented, entangled microfibers; the air laid, fibrous mat having a weight between 75 and 150 grams per square meter and a thickness between 0.05 and 0.25 inches; the microfibers having a mean diameter between 1.2 and 1.7 microns; and the air laid fibrous mat having first and second major surfaces contacting major surfaces of the electrode plates, a thickness, when subjected to a loading of 1.5 psi, greater than a spacing between the electrode plates, and a resilience which allows the separator to maintain contact with the electrode plates while undergoing repeated compressions and expansions, in a direction perpendicular to the major surfaces of the air laid, fibrous mat, when the electrode plates expand and contract during the service life of the battery.

19. The starved electrolyte battery according to claim 18, wherein: the air laid, fibrous mat consists essentially of glass microfibers.

20. The starved electrolyte battery according to claim 18, wherein: the air laid fibrous mat is binderless.

21. The starved electrolyte battery according to claim 18, wherein: the microfibers of the air laid, fibrous mat have an average length, as measured by the Bower-McNet test method, of at least 0.8 mm.

22. The starved electrolyte battery according to claim 18, wherein: the air laid, fibrous mat can withstand an elongation of at least 2% prior to rupture.

23. The starved electrolyte battery according to claim 18, wherein: the air laid, fibrous mat has a thickness, when subjected to a loading of 1.5 psi, that is at least 110% of the spacing between the electrode plates of the battery.

24. The starved electrolyte battery according to claim 23, wherein: the separator extends beyond a periphery of the electrode plates to form an extended electrolyte reservoir.

25. The starved electrolyte battery according to claim 18, wherein: the air laid, fibrous mat has a thickness, when subjected to a loading of 1.5 psi, that is at least 120% of the spacing between the electrode plates of the battery.

26. The starved electrolyte battery according to claim 25, wherein: the separator extends beyond a periphery of the electrode plates to form an extended electrolyte reservoir.

27. The starved electrolyte battery according to claim 18, including means to increase the tensile strength of the air laid, fibrous mat.

28. The starved electrolyte battery according to claim 27, wherein: the means to increase the tensile strength of the air laid, fibrous mat comprises microfibers within the air laid, fibrous mat bonded together at their points of intersection by hydrolyzation of the microfiber surfaces.

29. The starved electrolyte battery according to claim 27, wherein: the means to increase the tensile strength of the air laid, fibrous mat comprises needle entangled microfibers throughout the thickness of the air laid, fibrous mat.

30. The starved electrolyte battery according to claim 29, wherein: the air laid fibrous mat is binderless.

31. The starved electrolyte battery according to claim 27, wherein: the means to increase the tensile strength of the air laid, fibrous mat comprises a first fibrous skin layer integral with a resilient fibrous layer more resilient than the first fibrous skin layer; the fibrous skin layer having a greater density and tensile strength than the resilient fibrous layer.

32. The starved electrolyte battery according to claim 31, wherein: the means to increase the tensile strength of the air laid, fibrous mat includes a second fibrous skin layer integral with the first fibrous skin layer and the resilient fibrous layer; the resilient fibrous layer being more resilient than the second fibrous skin layer and intermediate the first and second fibrous skin layers; and the second fibrous skin layer having a greater density and tensile strength than the resilient fibrous layer.

33. The starved electrolyte battery according to claim 31, wherein: microfibers in the first fibrous skin layer are more entangled than microfibers in the resilient fibrous layer.

34. The starved electrolyte battery according to claim 33, wherein: the microfibers in the first fibrous skin layer are hydroentangled.

35. The starved electrolyte battery according to claim 34, wherein: the air laid fibrous mat is binderless.

36. In a starved electrolyte battery including a container in which is positioned at least one positive electrode plate; a least one negative electrode plate; a separator interposed between the positive and the negative electrode plates; an electrolyte absorbed in the positive and negative electrode plates and the separator; a positive electrode lead joining the at least one positive electrode plate to a positive battery terminal; a negative electrode lead joining the at least one negative electrode plate to a negative battery terminal; the improvement comprising:

the separator comprising a resilient, air laid, fibrous mat of randomly oriented, entangled microfibers; the air laid, fibrous mat having a weight between 75 and 150 grams per square meter and a thickness between 0.05 and 0.25 inches; the air laid, fibrous mat being binderless; the microfibers having a mean diameter of 1.4 microns and an average length, as measured by the Bower-McNet test method, of at least 0.8 mm; the air laid, fibrous mat being capable of experiencing an elongation of at least 2% prior to failure; and the air laid, fibrous mat having first and second major surfaces contacting major surfaces of the electrode plates, a thickness, when subjected to a loading of 1.5 psi, greater than a spacing between the electrode plates, and a resilience which allows the separator to maintain contact with the electrode plates while undergoing repeated compressions and expansions, in a direction perpendicular to the major surfaces of the air laid, fibrous mat, when the electrode plates expand and contract during the service life of the battery.

37. The starved electrolyte battery according to claim 36, wherein: the air laid, fibrous mat has a thickness, when subjected to a loading of 1.5 psi, that is at least 110% of the spacing between the electrode plates of the battery.

38. The starved electrolyte battery according to claim 37, wherein: the separator extends beyond a periphery of the electrode plates to form an extended electrolyte reservoir.

39. The starved electrolyte battery according to claim 36, wherein: the air laid, fibrous mat has a thickness, when subjected to a loading of 1.5 psi, that is at least 120% of the spacing between the electrode plates of the battery.

40. The starved electrolyte battery according to claim 39, wherein: the separator extends beyond a periphery of the electrode plates to form an extended electrolyte reservoir.

* * * * *